United States Patent
Huber, Jr. et al.

(10) Patent No.: US 9,327,739 B2
(45) Date of Patent: May 3, 2016

(54) SLACK ADJUSTER HAVING A ONE PIECE HOUSING

(71) Applicant: NEW YORK AIR BRAKE, LLC, Watertown, NY (US)

(72) Inventors: Howard E. Huber, Jr., Black River, NY (US); Ann Gibson, Watertown, NY (US)

(73) Assignee: New York Air Brake, LLC, Watertown, NY (US)

( * ) Notice: Subject to any disclaimer, the term of this patent is extended or adjusted under 35 U.S.C. 154(b) by 51 days.

(21) Appl. No.: 14/488,530

(22) Filed: Sep. 17, 2014

(65) Prior Publication Data

US 2016/0075353 A1    Mar. 17, 2016

(51) Int. Cl.
*B61H 15/00* (2006.01)
*F16D 65/66* (2006.01)

(52) U.S. Cl.
CPC ............ *B61H 15/0057* (2013.01); *F16D 65/66* (2013.01)

(58) Field of Classification Search
CPC .......... F16D 65/66; F16D 65/62; F16D 65/64
USPC ...................................... 188/202, 197, 196 D
See application file for complete search history.

(56) References Cited

U.S. PATENT DOCUMENTS

| 4,593,797 A | * | 6/1986 | Schmitt .................. F16D 65/66 188/196 D |
| 4,825,980 A | * | 5/1989 | Schmitt .................. F16D 65/56 188/196 D |
| 6,186,284 B1 | | 2/2001 | Sauter et al. |
| 2009/0065312 A1 | | 3/2009 | Sommerfeld et al. |

FOREIGN PATENT DOCUMENTS

| GB | 1212170 | 11/1970 |
| WO | 2008097188 | 8/2008 |
| WO | 2012112659 | 8/2012 |
| WO | 2012174505 | 12/2012 |

OTHER PUBLICATIONS

International Search Report Form PCT/ISA/220, International Application No. PCT/US2014/056004, pp. 1-10, Dated May 12, 2015.

* cited by examiner

*Primary Examiner* — Melanie Torres Williams
(74) *Attorney, Agent, or Firm* — Bond Schoeneck and King PLLC; David Nocilly

(57) ABSTRACT

A slack adjuster having a single, unitary housing that changes in length to compensate for brake pad wear in a rail car braking system. A threaded tension rod extends a variable length from the housing depending on rotation of the tension rod relative to the housing. A clutch assembly enclosed within a rod guide controls rotation of the tension rod and an overtravel assembly positioned in the single housing controls whether the clutch assembly will allow or prevent rotation of the threaded rod. A control rod and actuating tube transmit the controlling forces to the overtravel assembly so that the tension rod will be retained in a new length when the slack adjuster needs to take up slack in the braking system.

14 Claims, 3 Drawing Sheets

SLACK ADJUSTER HAVING A ONE PIECE HOUSING

BACKGROUND OF THE INVENTION

1. Field of the Invention

The present invention relates to railroad braking system slack adjusters and, more particularly, to a slack adjuster having a single housing.

2. Description of the Related Art

Slack adjusters are provided in the brake rigging of railway vehicles to automatically adjust the slack in the brake rigging to maintain the brake cylinder piston rod travel within a specified distance. Brake cylinder piston rod travel is important for proper balancing of the fluid pressure in the brake cylinder so that all brakes on a train operate under the same conditions and timing and to ensure the substantially uniform braking forces are applied to each set of wheels on each car in the train. Conventional slack adjusters employ two separate housings for separately enclosing an overtravel assembly and a tension spring assembly that are then coupled together by a third housing, often referred to as a coupling body, which houses the clutch assembly for ratcheting the tension rod and adjusting the length of the slack adjuster. Accordingly, there is a need for a slack adjusting having a single housing to reduce the number of housings and connections required to make the slack adjuster.

BRIEF SUMMARY OF THE INVENTION

The present invention comprises a slack adjuster having a single, unitary housing and a threaded tension rod positioned within the housing to extend a variable length from the housing depending on rotation of the tension rod relative to the housing. A clutch assembly having a clutch and a pair of thrust bearings is positioned in the housing and engaged with the tension rod to selectively permit or prevent rotation of the tension rod, thereby controlling how much of the tension rod extends from the housing. A control rod is interconnected to an actuating tube that extends into second end of the housing to actuate an overtravel assembly positioned in the housing. The overtravel assembly is operatively connected to the clutch assembly to allow or prevent rotation of the clutch based on movement of the control rod relative to the housing. The slack adjuster further includes a rod guide fixedly attached to an intermediate portion of the housing and having a first end enclosing the clutch and a second end enclosing the tension rod. A cap is secured to the first end of the rod guide.

The overtravel assembly comprises a first sleeve extending within the housing and having a first flange operatively connected to the clutch assembly, a second sleeve extending within the first sleeve and having a second flange operatively connected to the control rod, and a spring positioned between the first flange of the first sleeve and the second flange of the second sleeve. A retaining ring engaging the second flange of the second sleeve and an inner surface of the first sleeve retains the second sleeve in telescoping engagement with the first sleeve to transmit forces applied by the actuating tube to the second flange to be transmitted to the clutch assembly by the first flange. In this regard, the overtravel assembly is interconnected to the clutch assembly by at least one pin that connects the first flange of the second sleeve to one of the thrust bearings. A cap encloses the second end of the housing and has a bore permitting the second end of the tension rod and the actuating tube to pass into and out of the housing. A wiper is positioned in the second end of the housing in engagement with the actuating tube.

A spring assembly is positioned in the housing between a plate of the tension rod and the first end of the housing, and a wear ring in the first end of the housing encloses the tension rod. The spring assembly comprises a pair of springs and a spring guide positioned therebetween. A wasp excluder permitting access to an interior portion of the housing may be positioned at various locations, such as in the first end of the housing, proximate to the clutch assembly, or proximate to the overtravel assembly, to allow for drainage of the interior of the housing.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
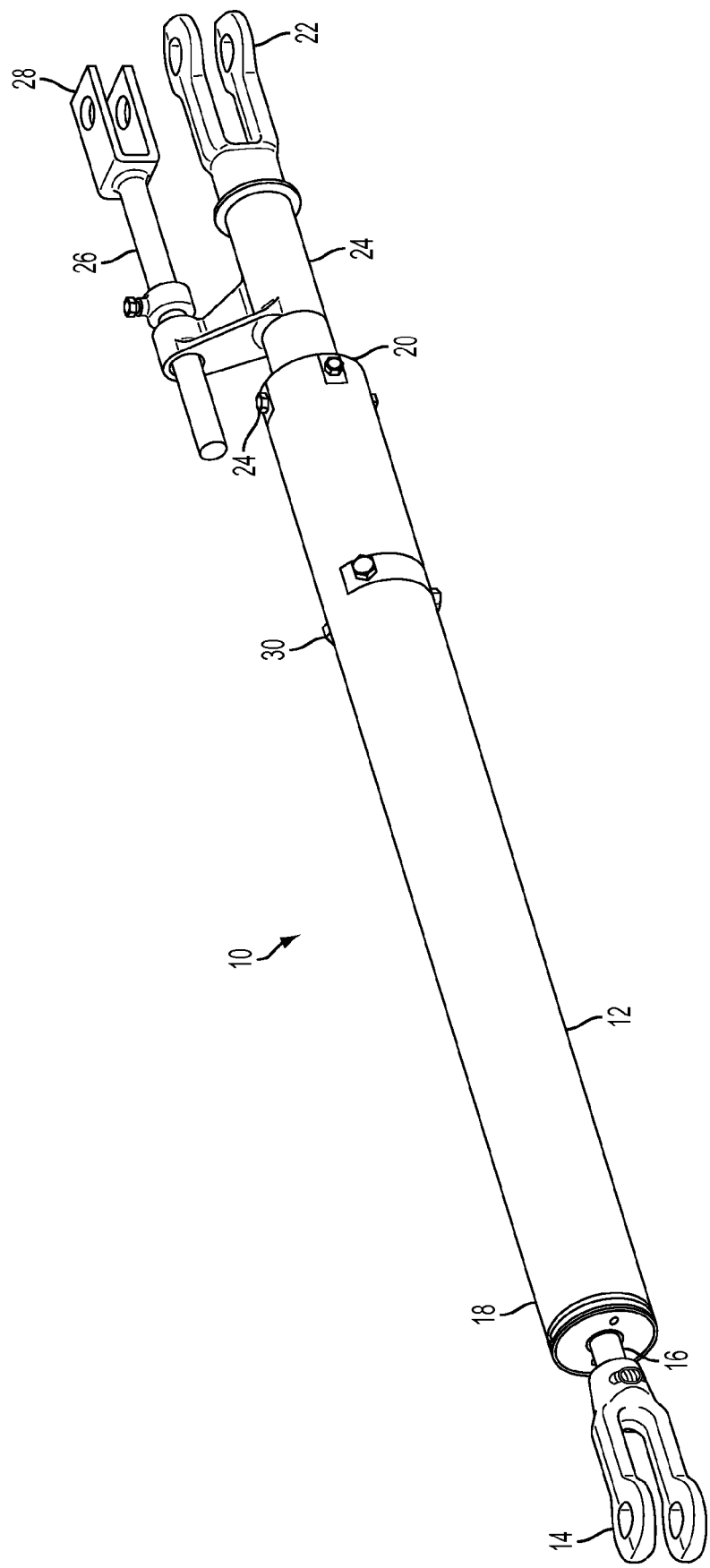
FIG. 1 is a perspective view of a slack adjuster according to the present invention.

Referring now to the drawings, wherein like reference numerals refer to like parts throughout, there is seen in FIG. 1 a slack adjuster 10 having a housing 12 comprised of a single integral unit or section. A clevis 14 is attached to a threaded tension rod 16 that extends from first end 18 of housing 12 for connection to the fulcrum of a foundation braking system. A second end 20 of housing 12 includes a second clevis 22 for connecting adjuster 10 to a brake lever of a foundation braking system. Second end 20 of housing 12 also includes an actuating tube 24 and associated control rod 26 and clevis 28 for interconnection to the brake lever at a point spaced apart from clevis 22. Housing 12 includes a first set of screws 30 positioned along an intermediate portion of single housing 12 for capturing an internally positioned rod guide 32 and a second set of screws 34 for capturing a cap 36 that encloses second end 20 of adjuster 10. As with conventional slack adjusters, slack adjuster 10 lengthens and shortens by the controlled rotation of threaded tension rod 16 within housing 12 in response to forces applies to clevis 14, clevis 22, and clevis 28 and ratcheting of tension rod 16 so that the length of rod 16 extending from first end 18 changes in response to changes in brake cylinder piston rod travel.

Figure 2:
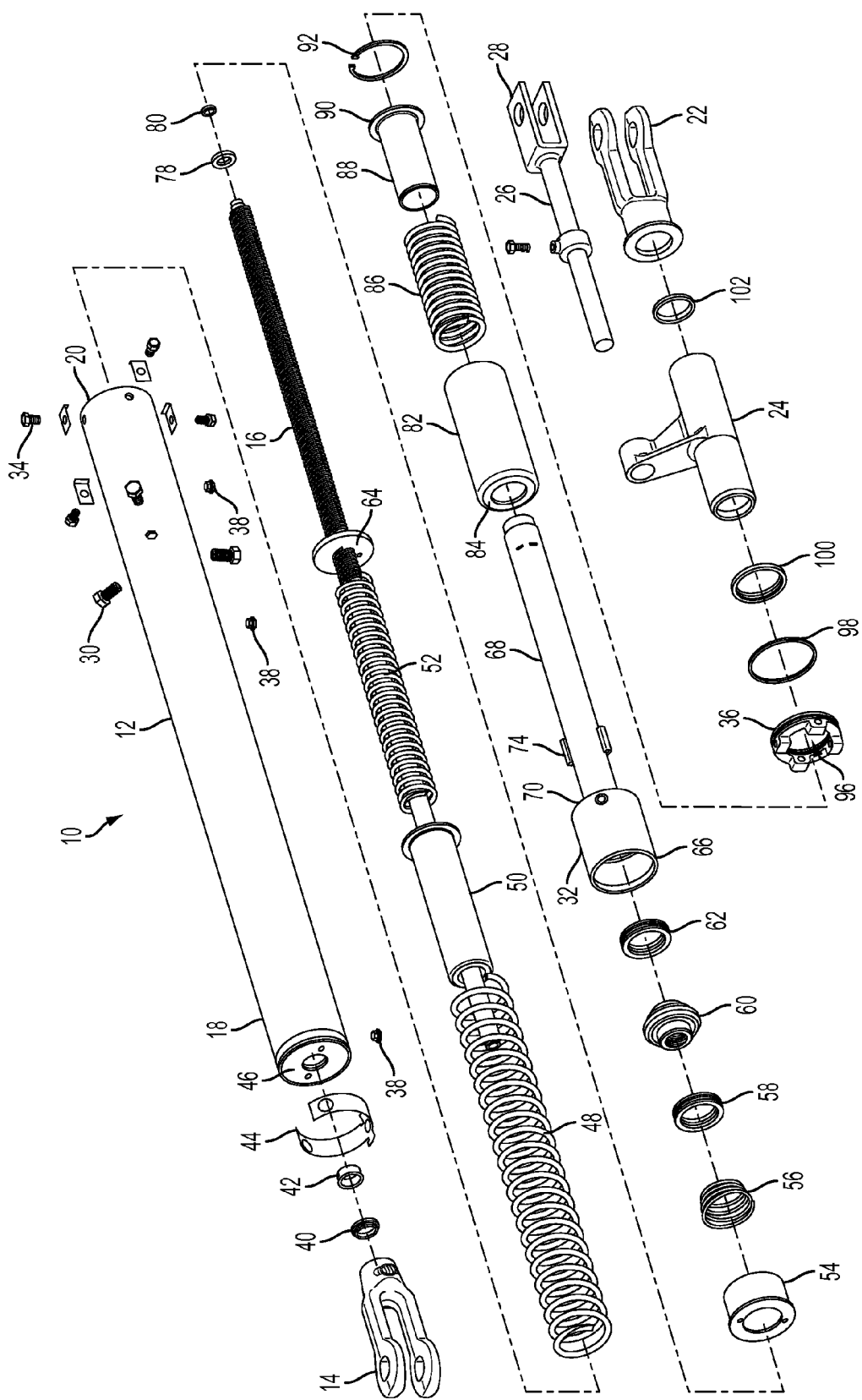
FIG. 2 is an exploded view of a slack adjuster according to the present invention.

Referring to FIG. 2, first end 18 of slack adjuster 10 includes a wiper 40 and wear ring 42 positioned about tension rod 16. A screw clip 44 secures screws 30 to housing 12. A wasp excluder 38 may be positioned at a drainage hole in any of first end 18, an intermediate portion of housing 12, or second end 20 to allow for the release of any moisture that may accumulate in the interior of housing 12. Tension rod 16 includes a plate 64 fixed along an intermediate portion thereof. A large diameter spring 48, spring guide 50 positioned inside spring 48, and internal spring 52 are positioned along tension rod 16 in abutting relation to the inside of first end 18 of housing 12 and plate 64 of tension rod 16. A cap 54, a spring 56, a first bearing 58, a clutch 60 that engages the threads of tension rod 16, and a second bearing 62 are positioned along tension rod 16 on the opposing side of plate 64 and thus comprise a clutch assembly within housing 12. Clutch 60 is free to rotate with axial movement of tension rod 16 due to corresponding slow twist threads on inside of clutch 60 and the outside of tension rod 16. When a force is applied to bearing 62, however, clutch 60 will immobilized, thereby preventing tension rod 16 from rotating and moving axially within housing 12.

Figure 3:
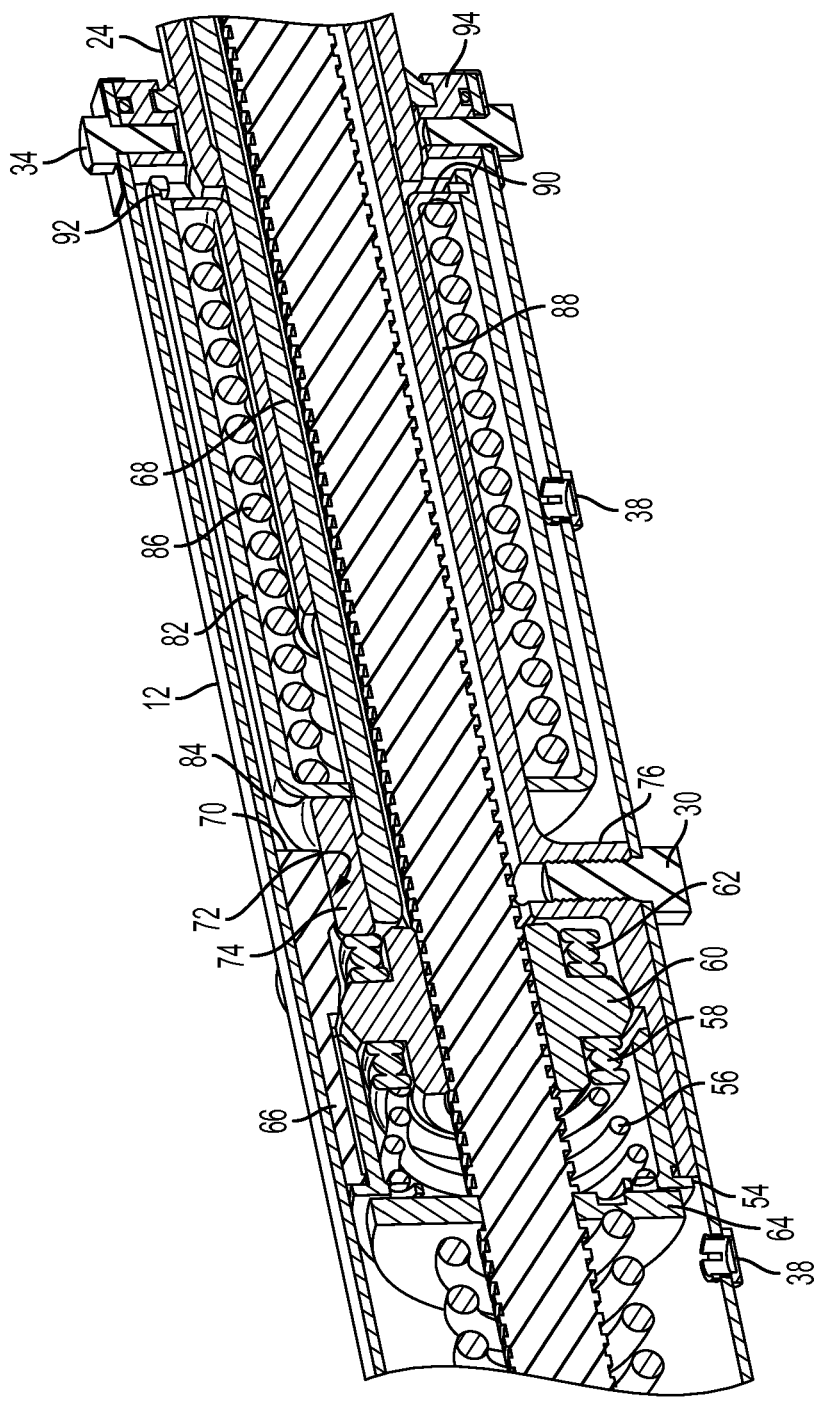
FIG. 3 is a longitudinal cross-section of a slack adjuster according to the present invention.

Rod guide 32 positioned about tension rod 16 extends from a first portion 66 having a wide bore that encloses cap 54, spring 56, first bearing 58, threaded clutch 60, and second bearing 62 to a second portion 68 having a narrow bore that closely surrounds tension rod 16. Cap 54 and first portion 66 of rod guide 32 are preferably secured together via complementary sets of threads. Referring to FIG. 3, first portion 66 and second portion 68 are separated by a shoulder 70 that defines passages 72 through which a pair of opposing pins 74 may pass, as well as a series of bosses 76 for receiving first set of screws 30 and fixedly retaining rod guide 32 within housing 12. Alternatively, screws 30 could comprise rivets, plug welds, or a crimping of the outer diameter of housing 18 to engage corresponding features on the outer surface of bosses 76, thus fixing bosses 76 to housing 18. A washer 78 is coupled to the end of tension rod 16 via a retaining ring 80 for smooth movement of rod 16 within the narrow bore of second portion 68 of rod guide 32. A sleeve 82 having is positioned about the second portion 68 of rod guide 32 so that a flange 84 of sleeve 82 abuts pins 74. Sleeve 82 encloses a spring 86 and an inner sleeve 88 having an opposing flange 90 that captures spring 86 within sleeve 82 and inner sleeve 88, thus forming an overtravel assembly within housing 12. Inner sleeve 88 is held within sleeve 82 by a retaining ring 92 that expands to interlock with the inner surface of sleeve 82. Retaining ring 92 has an inner diameter sufficient to allow actuating tube 24 to contact flange 90 of inner sleeve 88 if actuating tube 24 is moved axially along rod guide 32. Cap 36 that encloses second end 20 of housing 12 includes a series of bosses 94 for receiving second set of screws 34. Cap 36 includes a through bore 96 that allows rod guide 32 to extend out of housing 12 and allows actuating tube 24 to slide along rod guide 32 into housing 12. An o-ring 98 and wiper 100 may be positioned about actuating tube 24 to seal the connection between cap 36 and actuating tube 24 against the ingress of moisture and other contaminants. Rod guide 32 is secured to clevis 22 and a second wiper 102 is positioned along rod guide 32 within actuating tube 24 for sealing purposes.

Adjuster 10 may thus extend and contract in length by rotation of threaded tension rod 16 through clutch 60. When the overtravel assembly is actuated by a change in length of slack adjuster 10 that exceeds a predetermined amount as established by control rod 26, axial movement of actuating tube 24 along rod guide 32 and into housing 12 will impart a force to flange 90 of inner sleeve 88. When this force overcomes the bias force of spring 86 positioned between inner sleeve 88 and sleeve 82, sleeve 82 will apply a force to pins 74. Pins 74 will transmit this force through shoulder 70 of rod guide 32 to clutch 60 and bearings 58 and 62 to prevent clutch 60 from rotating. Tension rod 16 will be retained in any changed configuration, thereby changing the effective length of slack adjuster 10 and compensating for brake pad wear.

What is claimed is:

1. A slack adjuster, comprising:
   a single housing extending from a first end to a second end;
   a tension rod positioned within and extending a length from the first end of the housing that is moveable relative to the housing to change the length that extends from the housing;
   a clutch assembly having a clutch positioned in the housing and engaged with the tension rod to control movement of the tension rod relative to the housing;
   a control rod interconnected to the second end of the housing and moveable relative to the housing;
   an overtravel assembly positioned in the housing and operatively connected to the clutch assembly and the control rod to set the length of the tension rod that extends from the first end of the housing; and
   a rod guide having a first end enclosing the clutch and a second end enclosing the tension rod, wherein the rod guide is fixedly attached to an intermediate portion of the housing.

2. The slack adjuster of claim 1, further comprising a cap secured to the first end of the rod guide.

3. The slack adjuster of claim 2, wherein the clutch assembly further includes a pair of thrust bearings positioned on either side of the clutch and a spring engaging the cap and one of the thrust bearings.

4. The slack adjuster of claim 3, wherein the overtravel assembly comprises:
   a first sleeve extending within the housing and having a first flange operatively connected to the clutch assembly;
   a second sleeve extending within the first sleeve and having a second flange operatively connected to the control rod;
   a spring positioned between the first flange of the first sleeve and the second flange of the second sleeve; and
   a retaining ring engaging the second flange of the second sleeve and an inner surface of the first sleeve to retain the second sleeve in telescoping engagement with the first sleeve.

5. The slack adjuster of claim 4, wherein the overtravel assembly is interconnected to the clutch assembly by at least one pin.

6. The slack adjuster of claim 5, wherein the pin interconnects the first flange of the second sleeve to one of the thrust bearings.

7. The slack adjuster of claim 6, wherein the second sleeve of the overtravel assembly contacts an actuating tube that is attached to the control rod and positioned over the second end of the tension rod for axial movement into the second end of the housing.

8. The slack adjuster of claim 7, further comprising a cap enclosing the second end of the housing and having a bore permitting the second end of the tension rod and the actuating tube to pass into the housing.

9. The slack adjuster of claim 8, further comprising a wiper positioned in the second end of the housing in engagement with the actuating tube.

10. The slack adjuster of claim 9, further comprising a wear ring in the first end of the housing positioned about the tension rod.

11. The slack adjuster of claim 10, further comprising a plate fixedly connected to the tension rod and positioned against the cap of the rod guide.

12. The slack adjuster of claim 11, further comprising a spring assembly positioned in the housing between the plate of the tension rod and the first end of the housing.

13. The slack adjuster of claim 12, wherein the spring assembly comprises a pair of springs and a spring guide positioned therebetween.

14. The slack adjuster of claim 13, further comprising a wasp excluder permitting access to an interior portion of the housing.

* * * * *